UNITED STATES PATENT OFFICE.

FRIEDRICH MANN, OF BUFFALO, NEW YORK, ASSIGNOR TO J. F. SCHOELLOPF, JR., OF SAME PLACE.

MANUFACTURE OF ROSANILINE COLOR.

SPECIFICATION forming part of Letters Patent No. 262,680, dated August 15, 1882.

Application filed March 11, 1882. (Specimens.)

*To all whom it may concern:*

Be it known that I, FRIEDRICH MANN, of Buffalo, in the county of Erie and State of New York, have invented certain new and useful Improvements in Manufacturing Rosaniline Colors, of which the following is a specification.

This invention has reference to the manufacture of dye-stuffs or red coloring-matter which is applicable to dyeing and printing in the presence of mineral acids or acid mordants, and which is obtained by treating rosanaline with carbylsulphate or ethionic acid.

In carrying out my invention the dye-stuff commonly known as "fuchsine" or "rosaniline" is acted upon by a compound known by the scientific name of "sulphate of carbyl" or "ethionic acid." The sulphate of carbyl is obtained either by conducting the vapors of sulphuric acid into anhydrous alcohol or by conducting dried ethylene gas into liquid sulphuric acid, or by bringing ethylene gas together with the vapors of sulphuric acid. The carbylsulphate forms a crystalline deliquescent mass which, in the presence of water, forms at once ethionic acid according to the equation:

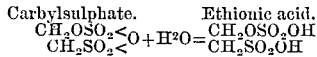

Carbylsulphate or its equivalent—ethionic acid—is employed in the manufacture of the new dye-stuff from rosaniline. For this purpose from two to three parts of carbylsulphate or ethionic acid are placed in an enameled kettle provided with a stirring device, and to the same is slowly added, under constant stirring, one part of rosaniline dried at 100° centigrade, or the corresponding quantity of a rosaniline salt. The resulting mass is then cautiously heated up to 100° centigrade. As soon as a sample of the fused mass dissolved in water ceases to yield any precipitate of rosaniline in the presence of alkali, then the formation of the new dye-stuff is completed and the entire body of the fused mass is introduced into a sufficient quantity of water. The red acid solution thus obtained is neutralized with lime, and the lime salt of the dye-stuff remaining in solution is filtered off from the precipitated calcium sulphate.

For practical purposes it is preferable to prepare an acid alkali salt of the dye-stuff, and for this purpose the properly-determined quantity of alkaline carbonate is added to the solution. From the precipitated calcium carbonate the solution is filtered off and evaporated to dryness under addition of the required amount of muriatic acid, which is determined by calculation, so as to obtain the acid salt.

The new dye-stuff or coloring-matter prepared as described can be used in the dye-bath and in printing in the presence of mineral acids or of mineral mordants, and produces a bright and permanent color of nearly the same shade as ordinary rosaniline.

Having thus described my invention, I claim as new and desire to secure by Letters Patent—

1. The process of producing a red dye-stuff or coloring-matter, which consists in treating rosaniline or a suitable salt thereof with sulphate of carbyl or ethionic acid, substantially as described.

2. The product herein described, consisting of a red compound or dye-stuff formed from reaction of rosaniline and sulphate of carbyl, substantially as described.

In testimony that I claim the foregoing as my invention I have signed my name in presence of two subscribing witnesses.

FRIEDRICH MANN.

Witnesses:
PAUL GOEPEL,
CARL KARP.